United States Patent
Ibuka et al.

(10) Patent No.: US 7,556,878 B2
(45) Date of Patent: Jul. 7, 2009

(54) FUEL CELL WITH SEPARATOR AND POROUS SUPPORT MEMBER INCLUDING HIGH DENSITY PORTION

(75) Inventors: Shigeo Ibuka, Ebina (JP); Keiko Kushibiki, Fujisawa (JP); Tatsuya Yaguchi, Yokosuka (JP)

(73) Assignee: Nissan Motor Co. Ltd., Yokohama-shi, Kangawa (JP)

( * ) Notice: Subject to any disclaimer, the term of this patent is extended or adjusted under 35 U.S.C. 154(b) by 8 days.

(21) Appl. No.: 11/815,165

(22) PCT Filed: Apr. 21, 2006

(86) PCT No.: PCT/IB2006/000972

§ 371 (c)(1),
(2), (4) Date: Jul. 31, 2007

(87) PCT Pub. No.: WO2006/111847

PCT Pub. Date: Oct. 26, 2006

(65) Prior Publication Data

US 2008/0152990 A1    Jun. 26, 2008

(30) Foreign Application Priority Data

Apr. 22, 2005   (JP) ............................. 2005-124913

(51) Int. Cl.
*H01M 8/10* (2006.01)
*H01M 2/00* (2006.01)
*H01M 2/14* (2006.01)

(52) U.S. Cl. .............................. 429/34; 429/32; 429/38

(58) Field of Classification Search .................. 429/38, 429/32, 34
See application file for complete search history.

(56) References Cited

U.S. PATENT DOCUMENTS

| 6,344,290 B1 * | 2/2002 | Bossel .......................... 429/38 |
| 2007/0037033 A1 * | 2/2007 | Chiba et al. ................... 429/34 |

FOREIGN PATENT DOCUMENTS

| DE | 101 35 336 C1 | 11/2002 |
| EP | 1 326 298 A1 | 7/2003 |
| JP | H11-097039 | 4/1999 |
| JP | 2004-247174 A | 9/2007 |
| WO | 98/35398 A1 | 8/1998 |
| WO | 2004/068622 A2 | 8/2004 |
| WO | 2006/016462 A1 | 2/2006 |

* cited by examiner

*Primary Examiner*—Patrick Ryan
*Assistant Examiner*—Bryant Suitte
(74) *Attorney, Agent, or Firm*—Young Basile

(57) ABSTRACT

The disclosure relates to a fuel cell including a solid electrolyte layer disposed on a separator plate. Another separator plate positioned adjacent the separator plate mounting the solid electrolyte layer are joined to a surface of the first separator plate to form an electrode separator assembly having a chamber between the joined separator plates. Working fluids may be supplied to or exhausted from the chamber through openings in fluid communication. A porous support member may be positioned within the chamber. The first separator plate and the porous support member may include a multiplicity of ribs defining channels in fluid communication with the chamber.

20 Claims, 12 Drawing Sheets

FUEL CELL WITH SEPARATOR AND POROUS SUPPORT MEMBER INCLUDING HIGH DENSITY PORTION

This application claims priority to Japanese Patent Application No. 2005-124913, filed Apr. 22, 2005, the entire content of which is incorporated herein by reference.

TECHNICAL FIELD

The invention relates to fuel cell systems and fuel cell components.

BACKGROUND

In a fuel cell, a fuel gas such as hydrogen and an oxidant gas containing oxygen are electrochemically reacted across an electrolyte to produce electrical energy. A conventional solid electrolyte fuel cell has a structure that contains a felt type pyroelectric member between a cell and a flat separator. In a related art, the felt type pyroelectric member is connected on the surface of the flat separator by wax or welding. See, for example, Japanese Laid-Open Patent Publication H11-97039 or 2004-247174.

SUMMARY

For the conventional solid electrolyte fuel cells, the structure of the felt type pyroelectric member is porous to allow fuel gas flow in it to reach the surface of the cell. The shape of the felt type pyroelectric is changeable because it is made of like a mesh. Therefore, it is difficult to make the bonding strength in strongly. A fuel cell described herein may, in certain embodiments, have increased strength of the connection between the separator and pyroelectric member.

In one aspect of the invention, a fuel cell comprises a first separator plate and a second separator plate joined to the first separator plate to form a chamber between the joined separator plates. The second separate plate has a mounting hole to fix a solid electrolyte layer. In the chamber, a porous pyroelectric member formed to a predetermined density installs a higher density part that other part of it. The part of which density is higher is connected to the first separator plate. The bonding part becomes stronger because the high density part is not transformed easily. Therefore, the high density part increases the bonding strength between the separator and the pyroelectric plate.

DETAILED DESCRIPTION

Figure 1A:
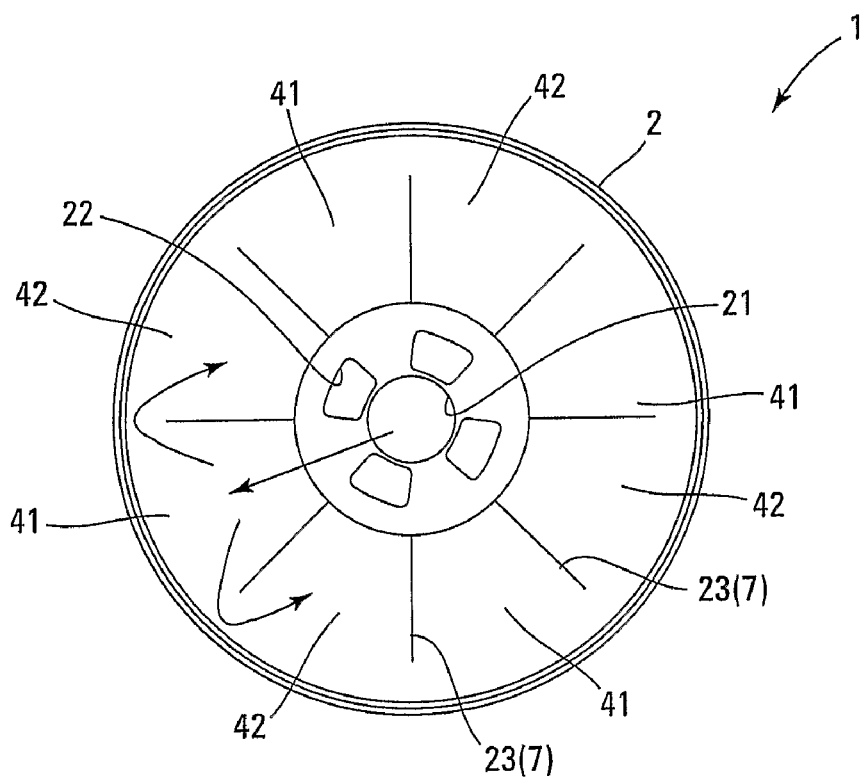
FIG. 1(A) is a plan view of a separator plate according to an embodiment of the present invention.

In preparing a fuel cell assembly from individual solid electrolyte unit fuel cells, a bonding force is applied only to the peripheral edges of the manifolds during bonding, which may lower the strength of the bond and reduce fuel cell durability. For fuel cell assemblies adapted for vehicular use, frequent starting and stopping or rapid acceleration or deceleration may input vibration or impact to the fuel cell assembly.

In addition, because the separator plates may be thin in order to reduce the thermal capacity and electrical resistance of the overall fuel cell stack, the strength of the separator plates may be reduced and the strength of the bond between the joined separator plates may also be compromised due to flexing of the separator plates. The separator plates may also shift position due to vibration or impact, thereby increasing the resistance between adjoining unit fuel cells or causing electrical short circuits.

According to some embodiments of the present invention, a fuel cell assembly is provided in which one or more ribs are positioned adjacent the porous support member in the chamber formed between two separator plates. At least one section of each rib may be bonded to an electrically conductive separator plate so in addition to bonding the porous support member to the electrically conductive separator plate by pressing firmly, the bonded section of the rib may function as a beam which reinforces the separator plate.

Various embodiments of the present invention will be described with respect to the following Figures and Examples. Other embodiments are within the scope of the claims, and it is understood that the invention is not limited to the specific embodiments described in the following detailed description of the invention, but includes these embodiments, as well as all embodiments encompassed by the claimed elements and their equivalents.

The fuel cell assembly of the present invention features a plurality of solid electrolyte unit fuel cells arranged in a stack. The unit fuel cells are separated by thin, electrically conductive separator plate that are reinforced and joined to the surface of the solid electrolyte layers by a plurality of ribs formed on a surface of the separator plates and/or the solid electrolyte layer. A chamber may be formed between adjoined separator plates. In some embodiments, a porous support member occupies at least a portion of the chamber. The porous support member (porous pyroelectric member) is preferably made of an electrically and thermally conductive material, such as a metal. The separator plates and the porous support member may be joined by bonding ribs on the surface of the porous support member to adjacent ribs on the surfaces of the separator plates.

Joining may, for example, be carried out using any joining means, including laser welding, resistance welding, seam welding, dispersion welding, soldering, brazing and bonding. Bonding may be achieved using one or more of a wax, a paste or an adhesive. The strength of the bonds between each bonded separator plate and each porous support member may thereby be increased. As a result, it may be possible to manufacture lower cost solid electrolyte fuel cells and fuel cell stack assemblies that are effective at reducing the contact resistance between the separator plates and the porous support member. It also may be possible to prevent a shift in the position of the porous support member relative to the separator plates caused by vibration or impact, thereby reducing short circuits and increasing fuel cell assembly reliability.

The shape of the solid electrolyte fuel cell according to certain embodiments of the present invention is not particularly limited, and the fuel cell and fuel cell components may, for example, exhibit a generally rectangular or a generally circular cross-section. The ribs of the porous support member may be formed by applying pressure such as that in a press.

The solid electrolyte fuel cells according to certain embodiments of the present invention may also feature a structure with a gas distribution function for gas passing through channels formed between bonded ribs of the porous support member and the separator plate. In this case, it may not be necessary to position a gas distribution manifold within the chamber, thereby maintaining the overall thinness of the unit fuel cell and a fuel cell stack assembly.

The solid electrolyte fuel cell according to certain embodiments of the present invention may exhibit improved strength of the separator plates and at least one of the separator plates may have a fluid manifold. The fluid manifold may be formed by compression of two or more separator plates in a press. Additionally, to reinforce the strength of the separator plates, there may be a structure positioned where a rib of the porous support member is aligned with the manifold in the separator plate.

For example, with a structure that makes it possible to engage the rib of the porous support member with the manifold of the separator plate via an indentation in the rib of the porous support member and a rib in the rib of the porous support member, it is simple to align the porous support member with the separator plate during assembly of the solid electrolyte fuel cell.

In this case, the shape of the manifold on the separator plate is determined by the gas distribution properties and the strength needed for the separator plate. For example, if the separator plate is round, the manifold is formed as a partition in the radial direction that should have a separator plate reinforcing effect. In this case, if the manifold with the partitioning function divides the gas intake opening side from the outlet side, the gas distribution properties are enhanced. If the manifold is positioned around the separator plate, the bonding strength with the porous support member and the strength of the entire separator plate can be enhanced.

The solid electrolyte fuel cell according to certain embodiments of the present invention may have a plurality of channels formed between the bonded sections on the rib of the porous support member bonded with the electrically conductive separator plate on one side, and the electrically conductive separator plate on the other side, and these channels may provide a path for flow of fuel cell working fluids, for example fuel gas and oxidant gas, to the solid electrolyte layer of the fuel cell. The channels and manifold formed on the separator plates may also provide a working fluid conduit between unit fuel cells in a fuel cell stack assembly.

In certain embodiments, fuel cell working fluid (e.g. fuel gas or oxidant gas) dispersion and distribution may be enhanced. For example, if the separator plate is round, the flow of gas may be directed radially outward toward the outer circumference of the unit fuel cell from the center manifold of the separator plate using a plurality of ribs directed radially outward from a position proximate the center of the separator plate to a position proximate the outer circumference of the separator plate. As the gas may be released to the surface of the solid electrolyte layer along this radially outward path, the gas dispersion and distribution may be improved. If the channels are formed so the gas flows towards the fuel cell periphery and gas is released in the appropriate positions along the face of the solid electrolyte layer, an unequal distribution of gas may be prevented, which may result in a more uniform temperature distribution within the solid electrolyte layer.

The solid electrolyte fuel cell according to certain embodiments of the present invention may be constructed such that the bonded section on the rib of the porous support member bonded with the electrically conductive separator plate on one side is bonded with the electrically conductive separator plate on the other side, and the ribs provide a conduit for passing gas through the chamber between both separator plates. In this case, there may be no need for a porous support member mounted in the chamber between separator plates to increase gas dispersion and distribution.

For example, if formed so the separator plate is round, the step on the separator plate manifold may increase and when bonding with the rib of the porous support member in this position, the pressure loss in this bonded section may increase. Thus in some embodiments, a porous support member may be mounted between separator plates, for example, within a chamber formed between joined separator plates. In certain embodiments, a step may be formed by the manifold of both separator plates, which may enable the ribs to be formed near the center of the cell and may allow the ribs of the porous support member to be bonded to the manifolds of each separator plate.

The solid electrolyte fuel cell according to certain embodiments of the present invention may be constructed such that there is a porous support member inside the chamber between two separator plates, and the porous support member may be joined to the solid electrolyte layer at a position outside of the chamber when inserted between the electrically conductive separator plates. In this case, the anode and cathode sides of the solid electrolyte layer are secured from both sides to the separator plates, so both ends of the solid electrolyte layer can be secured together, which simplifies processing.

The solid electrolyte fuel cell according to these embodiments may be constructed such that the porous support member has a shape that is a mesh, a non-woven shape or a metal foam, or the like, and may be produced from a heat resistant alloy (such as SUS430, SUS310S or Inconel 750, 718) with the primary element of Fe or Ni, and containing Cr, or a metal such as Ni, Pt and Ag.

If the porous support member is a mesh, the wire diameter may be about 100~200 μm to impart flexibility. The porous support member may not require a thermal expansion coefficient matching the thermal expansion coefficient of the cell material, but the conductivity of the surface is preferably high, and the material preferably resists hardening due to repeated thermal shock. Additionally, this porous support member may reduce the contact resistance between both sides due to the contact area applied to each cell so the shape of each cell surface may be flexible or elastic to fit the shape of the surface of each cell.

The solid electrolyte fuel cell according to certain embodiments of the present invention is constructed such that the bond between the porous support member, solid electrolyte layer and/or the electrically conductive separator plates is formed using any joining means, including laser welding, resistance welding, seam welding, dispersion welding, soldering, brazing and bonding. Bonding may be achieved using one or more of a wax, a paste or an adhesive. Preferably, bonding may be achieved using one or more of an electrically conductive wax, an electrically conductive paste, or an electrically conductive adhesive. If the bonded section between the porous support member and the electrically conductive separator plates functions as a beam, the bond should not be intermittent but linear.

If bonding the porous support member, the solid electrolyte layer and the electrically conductive separator plates via welding, pressure may be applied while heating. If bonding by diffusion bonding between the porous support member and the electrically conductive separator plates, bonding may be performed by applying a load of about 110 kg$_f$/cm$^2$ on the ribs at a high temperature of less than about 1000° C., preferably under vacuum conditions. If bonding with waxes, conductive pastes or adhesives, force may be applied to the ribs and there may be an indentation in the manifold of the separator plate to act as a receptacle for the bonding material. Preferably, the bonding material is in a fluid state at the time of bonding, but converts to a solid-like state upon completion of the bonding step or at a time shortly thereafter.

With wax application, the wax may be determined in conjunction with the operating temperature of the solid electrolyte fuel cell. For example, if the fuel cell operating temperature of about 700° C. is desired, the wax is preferably selected to have a melting point above that operating temperature, for example above about 705° C. Wax bonding may be performed at or above the wax melting point (for example, 780° C.) and fuel cell operation should therefore be limited to a lower operating temperature. Although many conductive waxes, pastes and adhesives may be selected in this manner according to the fuel cell operating temperature, assuming an operating temperature of about 700° C., Pt and Ag pastes may be suitable conductive paste materials, and heat-resistant ceramics or stainless steel putties may be suitable adhesive materials.

The solid electrolyte fuel cell according to certain embodiments of the present invention may be constructed such that there is no increase in the heat capacity and mass from the perspective of starting or operating so the electrically conductive separator plates may be formed in a thickness of 0.05~0.5 mm. Materials for the electrically conductive separator plates can be used with stainless rollers but if installing a high temperature cell, the material for the electrically conductive separator plates is preferably a stainless steel such as SUS316L, SUS430 or an alloy of Fe—Cr such as SMG or FeCrW. In certain embodiments, it may be desirable to use a Ni alloy such as Inconel, and it is preferred that the separator plate material have a thermal expansion coefficient that is close to that of the fuel cell component materials.

In certain additional embodiments, a fuel cell assembly may be manufactured by stacking a plurality of unit fuel cells with a separator plate assembly between each unit fuel cell. The fuel cell stack assembly may then be bonded together to form a laminate structure, with bonding occurring between the separator plates and the adjacent porous support member. In certain preferred embodiments, the individual unit fuel cells have the structure of a solid oxide fuel cell. With this structure, the strong thermal shock when starting or stopping fuel cell operation may be avoided, thereby increasing the structural durability of the fuel cell assembly over a range of operating conditions. The unit fuel cell of a solid oxide fuel cell may be either an electrode supported type or an electrolyte supported type. Additionally, since electrically conductive separator plates are used, the fuel cell operating temperature may be selected to be relatively high, but should preferably remain less than about 700° C. to prevent degradation of the bonding materials used to join the separator plates.

The following detailed discussion of the Figures provides a detailed description of the present invention using certain exemplary embodiments but the present invention is not limited to those embodiments, but includes all embodiments within the scope of the claim elements and their equivalents.

Figure 1B:
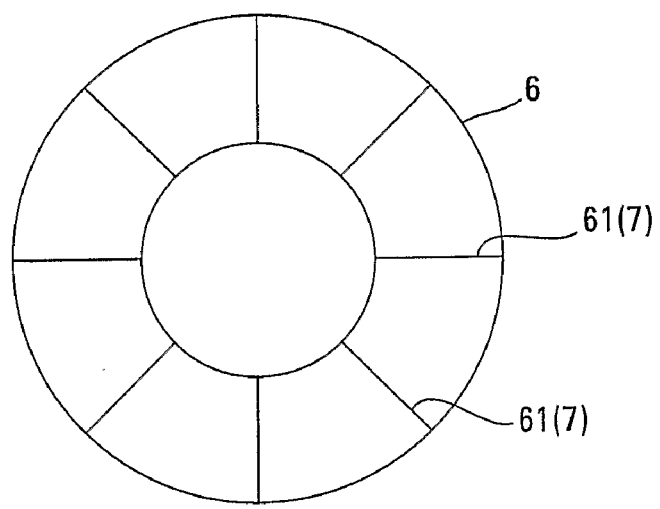
FIG. 1(B) is a plan view of a porous support member corresponding to the embodiment of the present invention illustrated in FIG. 1(A)
Figure 2A:
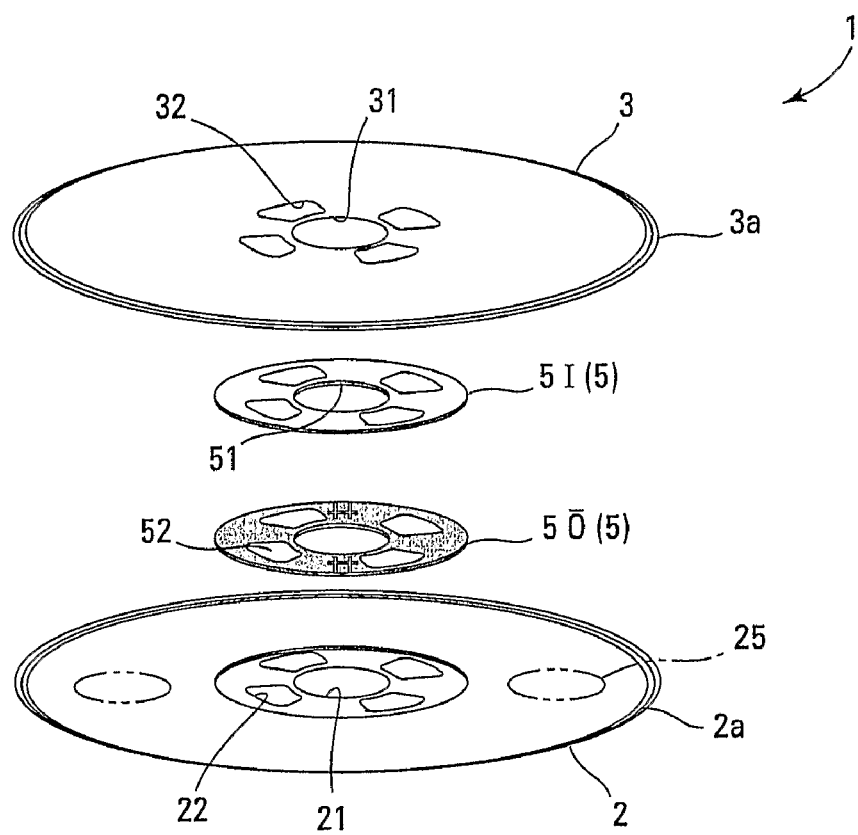
FIG. 2(A) is an exploded perspective view showing the positional relationship between adjacent separator plates in a fuel cell formed using separator plates according to the embodiment of FIG. 1(A).
Figure 2B:
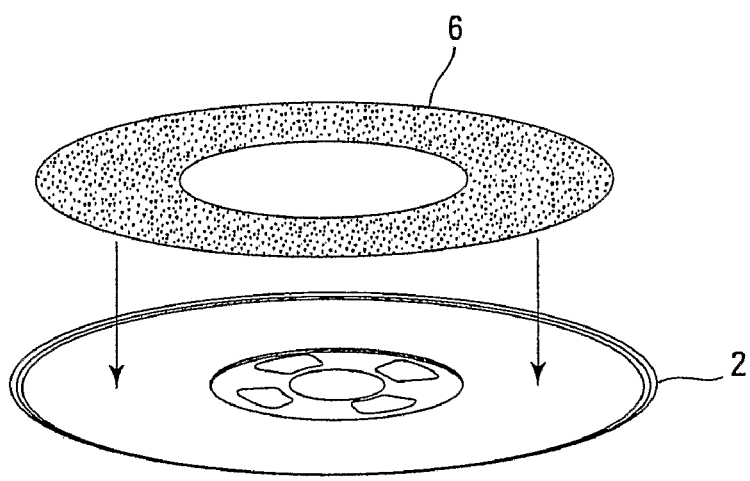
FIG. 2(B) is an exploded perspective view showing the positional relationship between the separator plate of FIG. 1(A) and the porous support member of FIG. 1(B).
Figure 3:
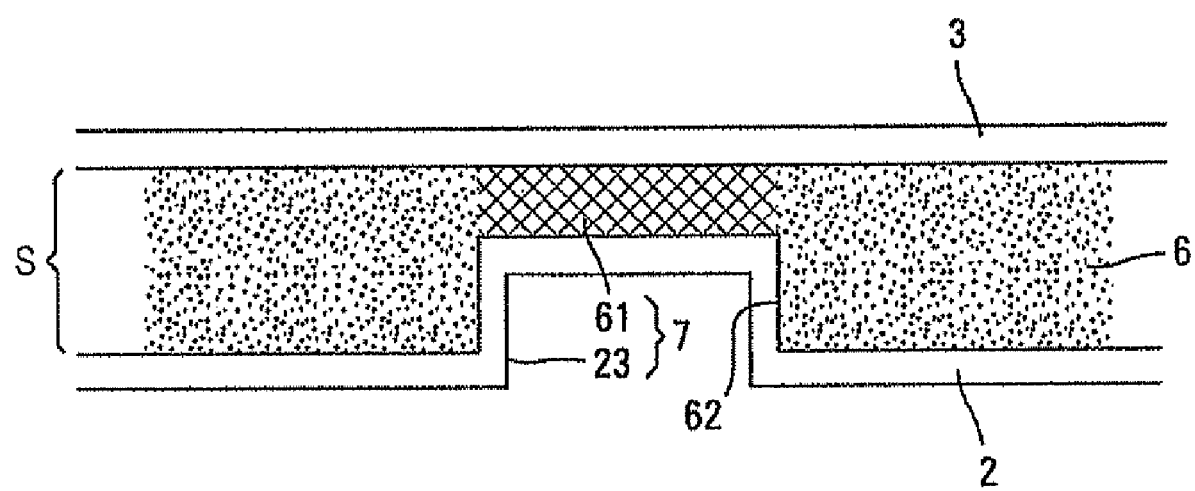
FIG. 3 is a cross-sectional view of the porous support member mounted between separator plates according to the embodiment illustrated in FIG. 1(A)-(B).

FIGS. 1-3 show one embodiment of a solid electrolyte fuel cell according to certain embodiments of the present invention. As shown in FIG. 1, a separator plate for one side 2 may be configured with eight ribs 23 defining fluid flow channels formed via press processing that run in the radial direction while the donut shaped porous support member 6 is also equipped with bonding bands 61 formed via press processing that run in the radial direction.

As shown in FIG. 2, a solid electrolyte fuel cell 1 is equipped with a separator plate for one side 2 that is a round thin plate and has a gas intake opening 21 and a gas discharge opening 22 in the center as well as a cell mounting hole 25; a separator plate for the other side 3 that is a round thin plate just like that in the separator plate for one side 2 and has a gas intake opening 31 and a gas discharge opening 32 in the center; a central flow channel part 5 for gas supply and gas discharge inside the chamber S formed between both of the separator plates 2, 3 that is equipped with a gas inlet 51 and a gas outlet 52 linked with gas intake openings 21, 31 and gas discharge openings 22, 32 on both separator plates 2, 3; and a porous support member 6 formed in the shape of a donut that can bond with the separator plate for one side 2 in the chamber S. These separator plates 2, 3 face each other so the peripheral areas 2a, 3a can be bonded.

The central flow channel part 5 is positioned in the center of both separator plates 2, 3 facing each other for bonding and is equipped with a gas intake part 5I formed of the gas inlet 51 that is linked with the gas intake opening 31 of the separator plate 3 as well as a gas discharge part 5O formed of the gas outlet 52 that is linked with the gas discharge opening 22 of the separator plate 2.

As shown in FIG. 3, in this embodiment, the rib 23 on the separator plate 2 engages with the slot 62 formed by the rib bonding bands 61 on the porous support member 6 to form a bond and the rib bonding bands 61 may also bond with the other separator plate 3. The pressure loss in this bonded section increases so channels 41 and 42 may be formed between ribs 7 are formed between the rib bonding bands 61 of the porous support member 6 and the ribs 23 of the separator plate. Thus, there are four fluid discharge channels 41 and four fluid intake channels 42 formed on the same surface as the fluid discharge channels 41.

The four fluid discharge channels 41 formed by the eight of the solid electrolyte layer mounted between ribs 7 supply gas to reach the periphery of the separator plate for chamber S via the gas intake opening 31 of the separator plate 3 and the gas intake part 5I of the central flow channel part 5. The four fluid intake channels 42 circulate gas that reaches the periphery of the separator plate for chamber S to the gas discharge part 5O of the central flow channel part 5 as well as the gas discharge opening 22 of the separator plate 2 (refer to the arrows in FIG. 1).

In this case, the cell mounting holes 25 are positioned in eight locations around the center of the separator plate for one side 2 (in FIG. 2, only two cell mounting holes 25 are shown), and the solid electrolyte layer mounted between ribs 7 are positioned on the eight cell mounting holes 25 where the cell is secured. In this embodiment, a ferrite SUS round plate with a thickness of 0.1 mm was used for the separator plates 2, 3. The separator plate 2 may be manufactured, for example, with eight ribs 23 extending about 1.2 mm from the surface of the separator plate. In some embodiments, the ribs may be formed in the radial direction using a press device capable of applying a high pressure. The porous support member 6 is formed of a woven mesh to a density of about 1 g/cm$^3$ using Inconel 750 wire in a thickness of 2 mm. This porous support member 6 is subject to pressing to form eight rib bonding bands 61 with thicknesses of 0.8 mm, The density of the bonding bands 61 has become three or four times higher than the other part of it by process of pressing. The bonding bands 61 become stronger because the high density part is not transformed easily. Therefore, the bonding part 61 increases the bonding strength between the separator and the pyroelectric plate.

By forming these rib bonding bands 61, the separator plate 2 ribs 23 are engaged with the porous support member 6 slots 62 and the solid electrolyte layer mounted between ribs 7 are formed by laser welding the rib bonding bands 61 and the ribs 23. These solid electrolyte layer mounted between ribs 7 are bonded with the separator plate for the other side 3 via laser welding, which bonds each of the peripheral areas 2a, 3a on the separator plates 2, 3.

The laser welding conditions were 1,064 nanometers wavelength, 580 Watts power, 3 milliseconds pulse delay, 20 Hz repeat cycle, and exposure rate of 1 m/min. In addition to the convenience of using a jig, conducting laser welding from the press side provides superior operability and it is also possible to control the occurrence of welding distortion. From a functional perspective, laser welding from the non-press side is similar and if laser welding is performed from both sides, there may be an increase in the bond strength as well as an additional level of reinforcement.

With this solid electrolyte fuel cell 1, the gas fuel is introduced into the chamber S between both separator plates 2, 3 that forms a manifold via the gas inlet 5I on the central flow channel part 5. As shown by the arrows in FIG. 1, fuel cell working fluid (e.g. oxidant or fuel gas) reaches the peripheral areas 2a, 3a of the separator plates via the fluid discharge channels 41 formed by the porous support member mounted between ribs 7. In the same manner, it is discharged from the gas outlet 52 on the gas discharge part 50 of the central flow channel part 5 via the fluid intake channels 42 formed by the porous support member mounted between ribs 7. The gas flows between the layers of the laminated solid electrolyte fuel cell.

With the solid electrolyte fuel cell 1, since porous support member mounted between ribs 7 are joined by bonds produced, for example, using laser welding, between the rib bonding bands 61 of porous support member 6 and the rib 23 from the separator plate 2 in the chamber S formed between the separator plates 2, 3. Alternatively or additionally, the porous support member 6 may be bonded by strong pressure to the electrically conductive separator plate 2 and the porous support member mounted between ribs 7. The porous support member 6 may perform the function of preventing collapse of the chamber S formed between the separator plates 2, 3 during assembly of a fuel cell stack. Porous support member 6 may reinforce the separator plates 2 and enhances the strength of the bond between the separator plates 2.

Additionally, with the porous support member 6 mounted between ribs 7 by forming joints or bonds between the rib bonding bands 61 and the ribs of the porous support member 6 and the ribs 23 from the separator plate 2 as described above, four fluid discharge channels 41 and four fluid intake channels 42 positioned on the same surface as the fluid discharge channels 41 may be formed. Thus, there may be no need to use a plate for partitioning the gas flow to the solid electrolyte layer, and therefore there may be greater gas dispersion and distribution to the unit fuel cell.

Figure 4A:
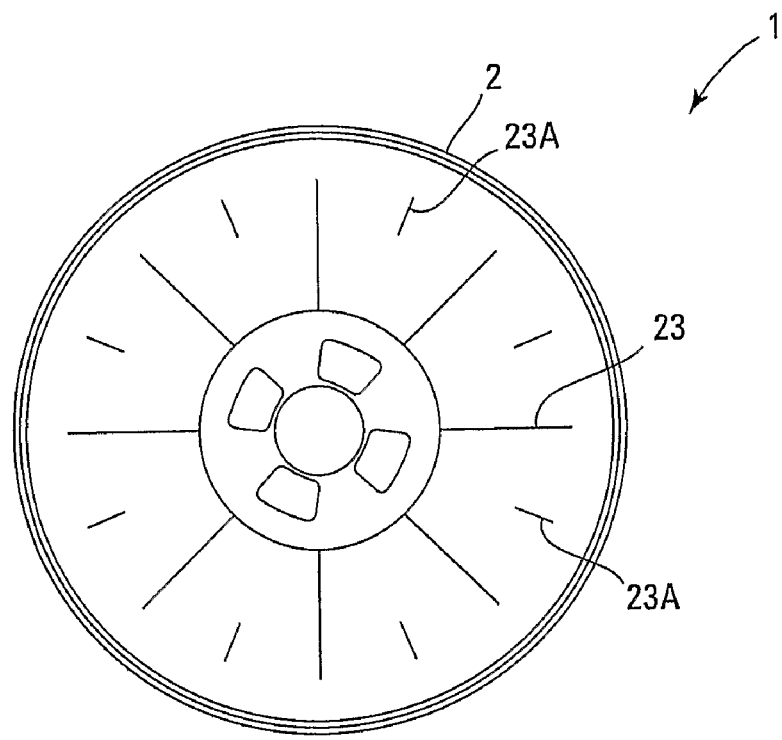
FIG. 4(A) is a plan view of a separator plate according to another embodiment of the present invention.
Figure 4B:
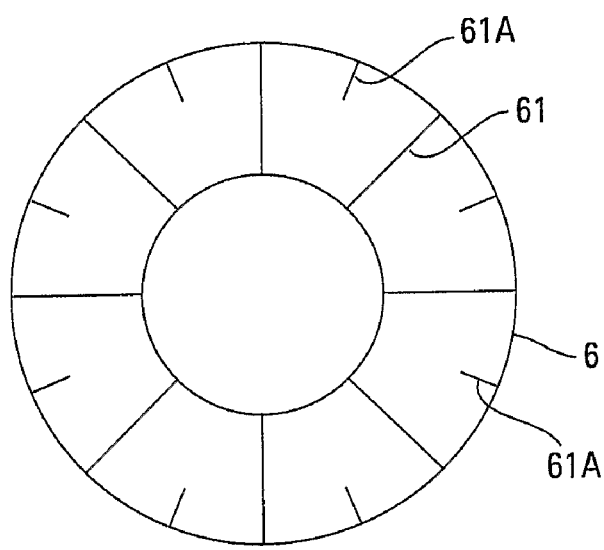
FIG. 4(B) is a plan view of a porous support member corresponding to the embodiment of the present invention illustrated in FIG. 4(A)

With the solid electrolyte fuel cell 1, the ribs 23 on the separator plate 2 engage with the slot 62 formed by the rib bonding bands 61 in the porous support member 6 to form a bond. As a result, in addition to reinforcing the separator plate 2, it becomes simple to align the porous support member 6 with the separator plate 2 during assembly of the solid electrolyte fuel cell 1. In this case, the shape of the manifold of the separator plate 2 is determined by the gas distribution and the strength required by the separator plate 2. For example, as indicated above, if the separator plate 2 is round, as shown in FIG. 4, in addition to ribs 23 that function as beams in the radial direction, there are press lines 23A that act as manifolds for the peripheral areas of the separator plate. Additionally, if there are rib bonding bands 61A that are ribs installed on the porous support member 6 that is aligned with this, it may be possible to increase the bonding strength between the separator plate 2 and the porous support member 6 as well as the strength of the actual separator plate 2.

Figure 5:
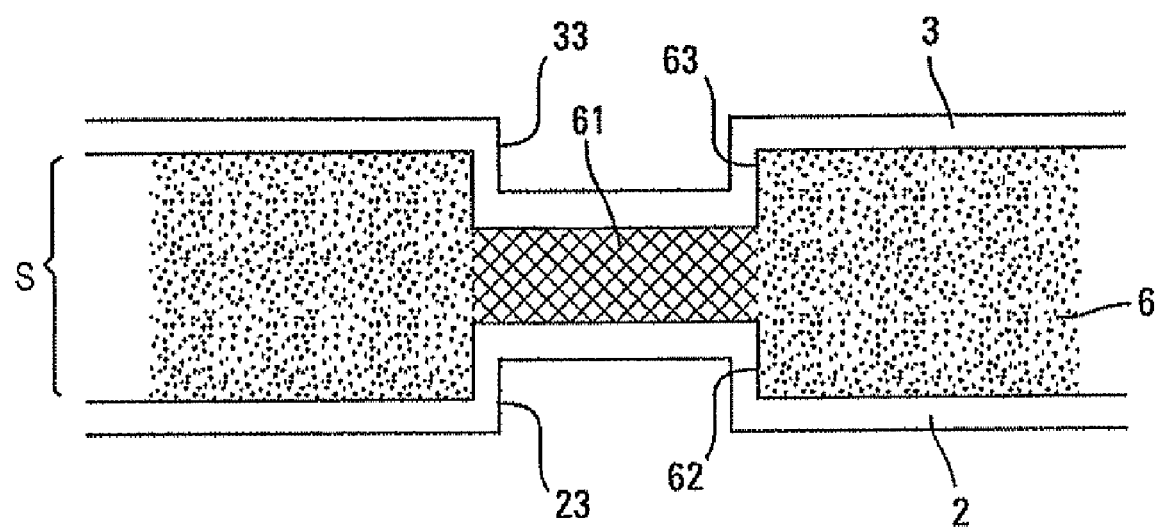
FIG. 5 is a cross-sectional view of the porous support member mounted between separator plates according to the embodiment of the present invention illustrated in FIG. 4(A)-(B).

With the solid electrolyte fuel cell 1, the rib bonding bands 61 in the porous support member 6 that bond with the ribs 23 of the separator plate 2 bond with the flat surface of the electrically conductive separator plate for the other side 3. For example, as shown in FIG. 5, there may be a rib 33 on the separator plate for the other side 3 that faces the rib 23 on the separator plate for one side 2. Additionally, there may be a slot 63 on the porous support member 6 that can engage with this rib 33 as well the rib 23 on the separator plate 2 that engages with slot 62 on the porous support member 6. The rib 33 on the separator plate 3 engages with the slot 63 on the porous support member 6 and the rib bonding bands 61 can bond with each of the ribs 23, 33 on both separator plates 2, 3 to bring an additional level of reinforcement to the separator plates 2, 3.

Figure 6A:
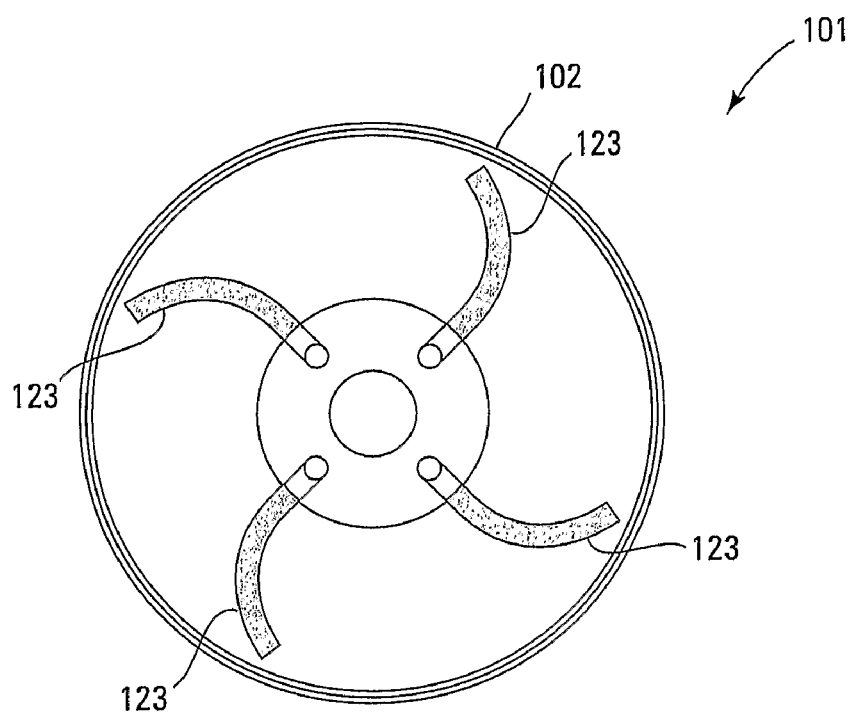
FIG. 6(A) is a plan view of a separator plate according to yet another embodiment of the present invention.
Figure 6B:
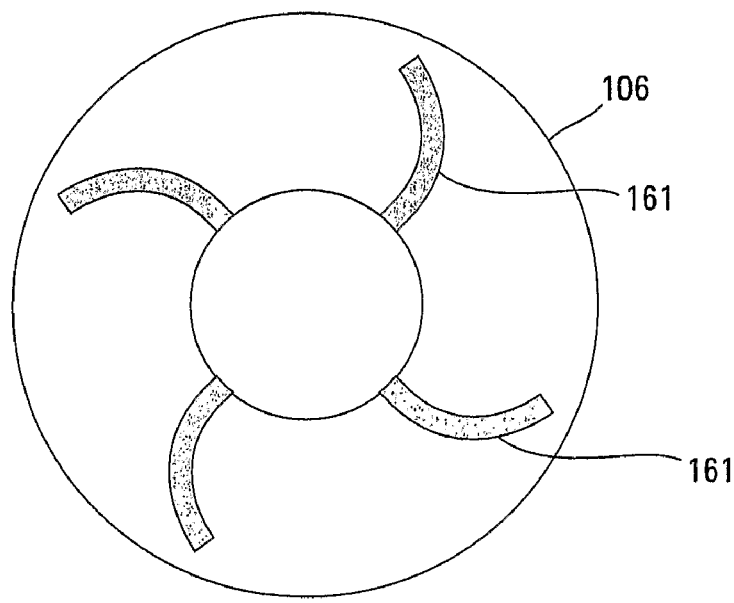
FIG. 6(B) is a plan view of a porous support member corresponding to the embodiment of the present invention illustrated in FIG. 6(A)
Figure 7:
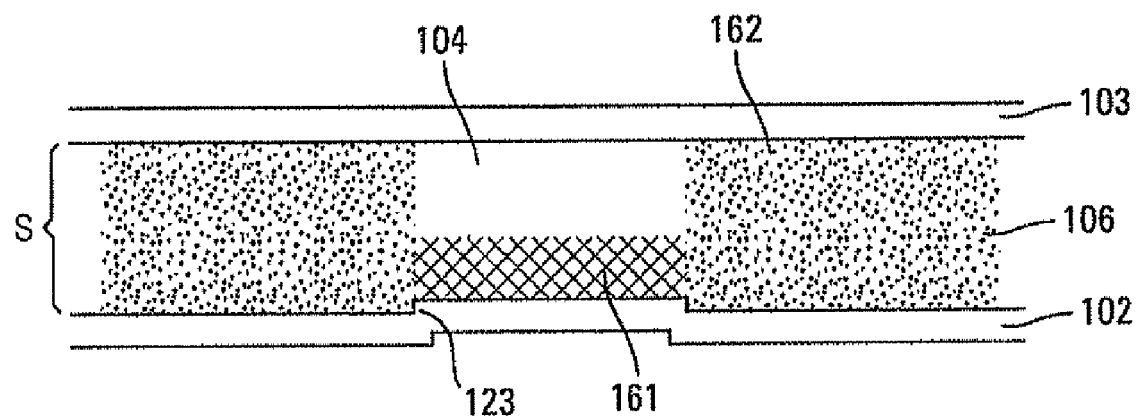
FIG. 7 is a cross-sectional view of the solid electrolyte fuel cell showing a gas channel according to the embodiment illustrated in FIG. 6(A)-(B).

FIGS. 6 and 7 show other embodiments of a solid electrolyte fuel cell according to certain embodiments of the present invention. As shown in FIG. 6, in this solid electrolyte fuel cell 101, the separator plate for one side 102 may be equipped with four curved ribs (manifolds) 123 formed in a press while the donut shaped porous support member 106 also may be equipped with four curved bonding bands 161, for example, compression formed bonding bands formed in a press.

In this embodiment, as shown in FIG. 7, the rib 123 of separator plate 102 engages with the slot 162 created by forming a bonding bands 161 in the porous support member 106 for a bond. There may be a gap between the bonding bands 161 and the electrically conductive separator plate for the other side 103. This gap creates a gas flow channel 104 within the chamber S between both of the separator plates 102, 103. The remainder of the structure is identical to the solid electrolyte fuel cell 1 from the previous embodiment.

With this solid electrolyte fuel cell 101, there may be a bond created by laser welding between the bonding bands 161 that is the rib of the porous support member 106 and the rib 123 from the separator plate 2 in the chamber S formed between the separator plates 102, 103, the porous support member 106 can be bonded by strong pressure to the electrically conductive separator plate 102 and the bonding bands 161 have the function of being a reinforcing material for the separator plate 102. This reinforces the separator plate 102 and enhances the strength of the bond between the separator plate 102 and the porous support member 106.

As indicated above, a gas flow channel 104 may be created in the direction from the center to the peripheral areas. If gas is released along the way, there may be no need for ribs and the gas dispersion and distribution may be improved. With the solid electrolyte fuel cell 101, the rib 123 on the separator plate 102 engages with the slot 162 formed by the bonding bands 161 in the porous support member 106 to form a bond. As a result, in addition to reinforcing the separator plate 102, it becomes simple to align the porous support member 106 with the separator plate 102 during assembly of the solid electrolyte fuel cell 101.

Figure 8A:
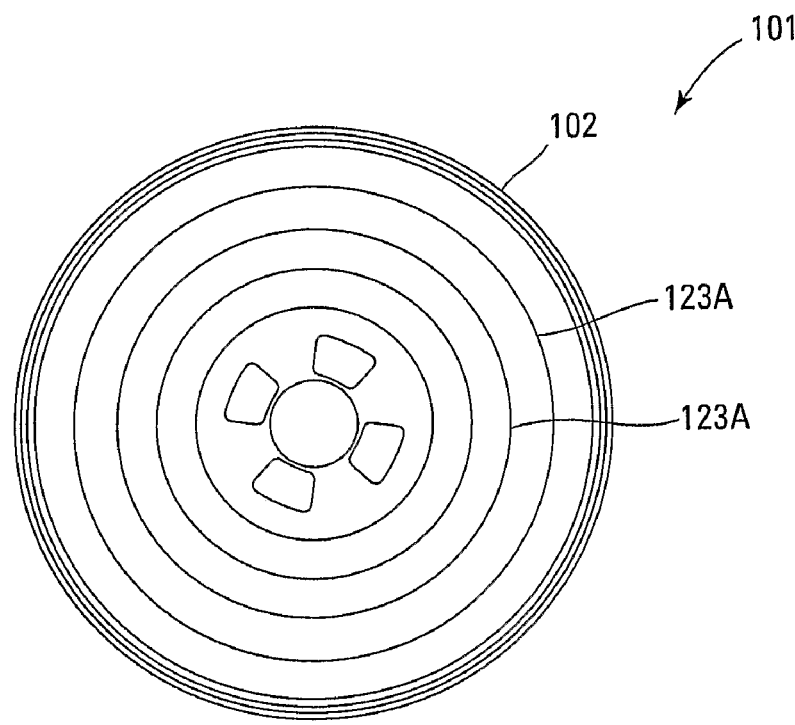
FIG. 8(A) is a plan view of a separator plate according to an additional embodiment of the present invention.
Figure 8B:
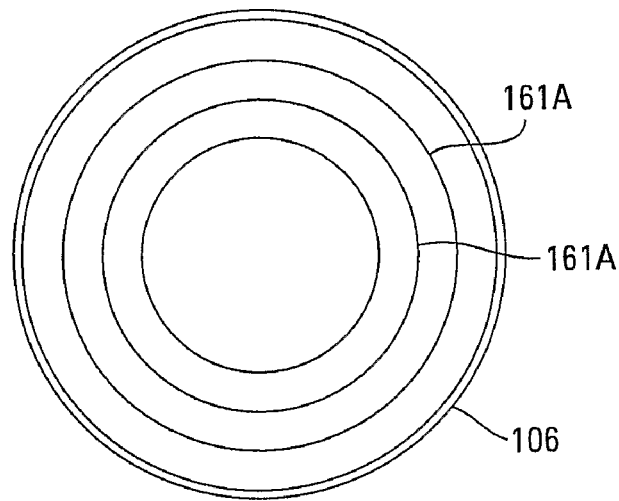
FIG. 8(B) is a plan view of a porous support member of a solid electrolyte fuel cell corresponding to the embodiment of the present invention illustrated in FIG. 8(A)

With the solid electrolyte fuel cell 101, the flow of gas may be toward the peripheral areas from the center along the gas flow channel 104, and as shown in FIG. 8, if the separator plate is round, a gas flow channel may be formed around the circumference of the rib 123 on the separator plate 102 and the bonding bands 161A of the porous support member 106. If gas is released in the appropriate position around the edges, an unequal distribution of gas will be prevented, which contributes to uniform temperature distribution within chamber S.

Figure 9:
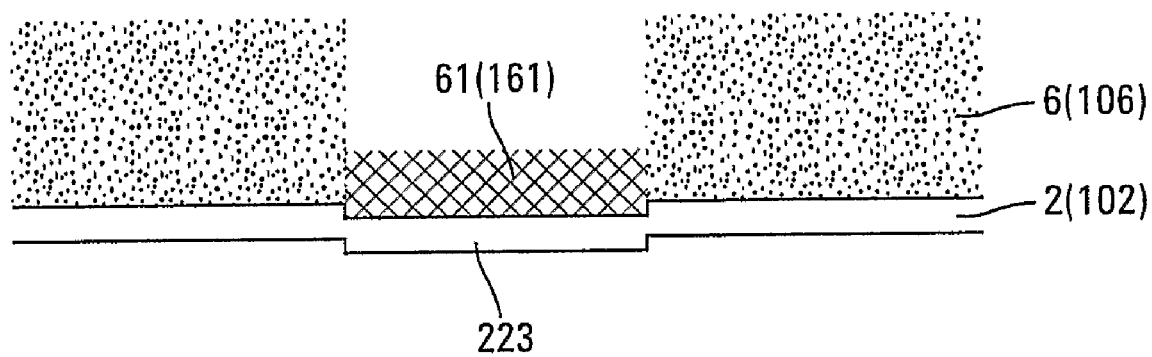
FIG. 9 is a cross-sectional view of a porous support member mounted on a separator plate showing a gas channel according to another embodiment of the present invention.

In the embodiments, the description was for bonding via laser welding between the rib bonding bands 61 (161) that is the rib of the porous support member 6 (106) and the rib 23 (123) from the separator plate 2 (102), but other bonding means such as wax application can be employed. In this case, as shown in FIG. 9, an indentation 223 may be formed in the separator plate 2 (102) as the manifold, which can function as a well for the wax material.

Figure 10:
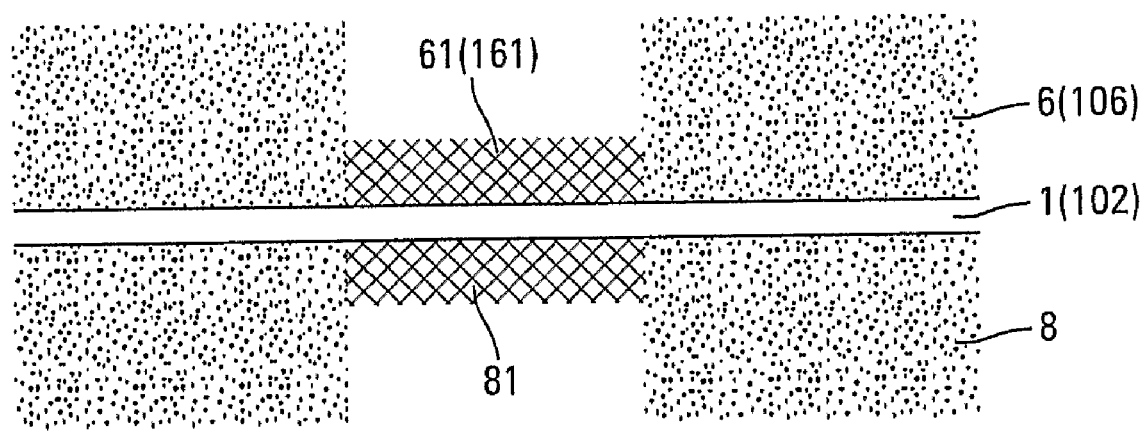
FIG. 10 is a cross-sectional view of adjacent separator plates on opposite sides of a membrane electrode assembly of a unit fuel cell showing a gas channel according to yet another embodiment of the present invention.

Also, in the embodiments, the description was for ribs 23 (123) formed on the separator plate 2 (102) as manifolds that were subject to bonding between the rib bonding bands 61 (161) that is the rib of the porous support member 6 (106) and chamber S on the ribs 23 (123). However, other configurations such as that shown in FIG. 10 are acceptable, with a porous support member 6 (106) and an electrically conductive separator plate 2 (102) in the chamber S and a porous support member 8 bonded with the compression formed rib bonding bands 81 from outside this chamber S. In this case, the anode side porous support member 6 (106) and the cathode side of the porous support member 8 are secured from both sides to the separator plates 2 (102) so both ends of the solid electrolyte layer can be secured together, which simplifies processing and forms a flat plate which may enhance the strength of the separator plate 2 (102).

Figure 11:
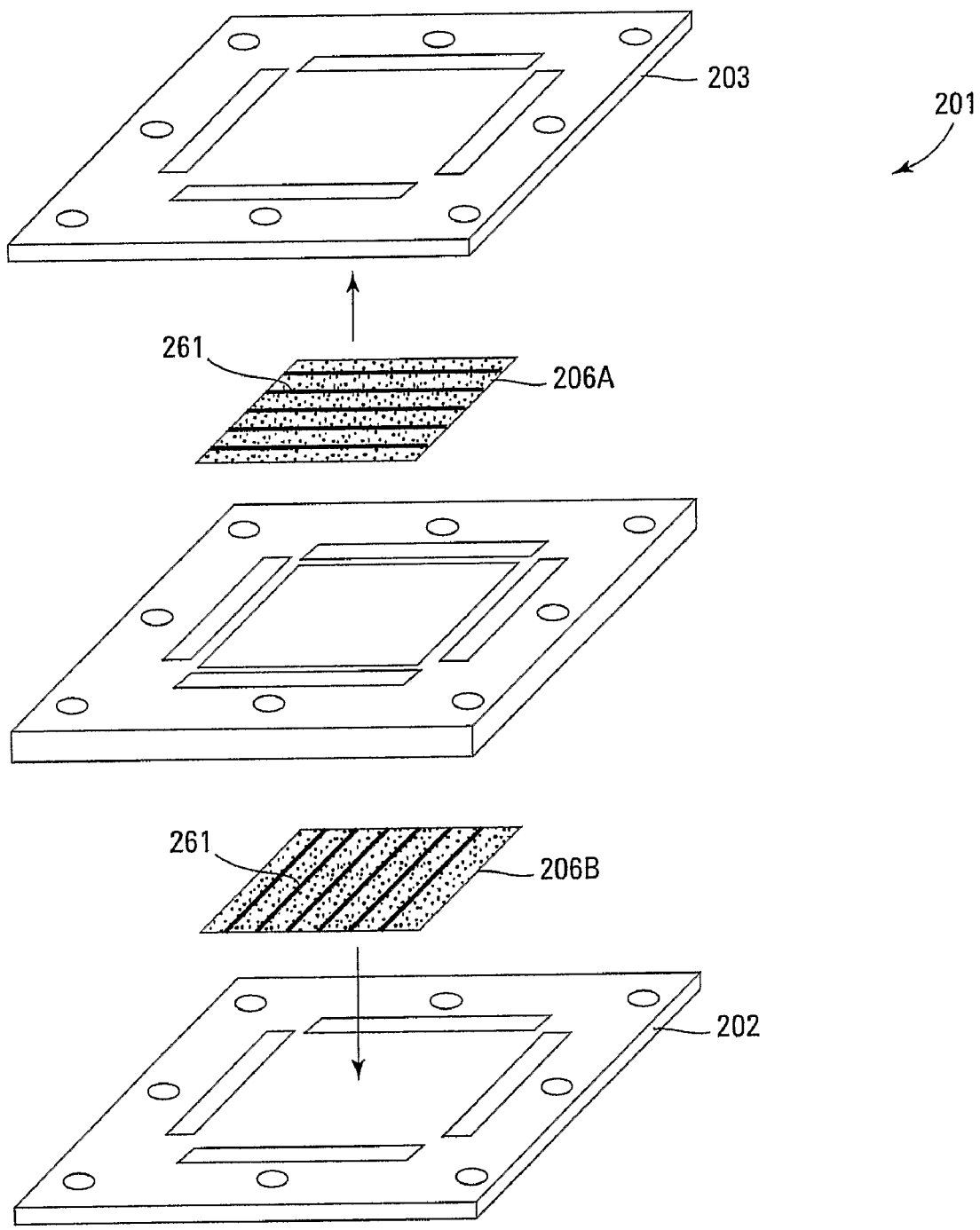
FIG. 11 is an exploded perspective view of a solid electrolyte unit fuel cell according to an additional embodiment of the present invention.

The shape of the solid electrolyte fuel cell according to certain embodiments of the present invention is not particularly important, and as shown in FIG. 11, the solid electrolyte fuel cell 201 can be equipped with square separator plates 202, 203 as well as a square cathode side porous support member 206A containing ribs 261 and a square anode side porous support member 206B containing similar ribs 261.

Figure 12:
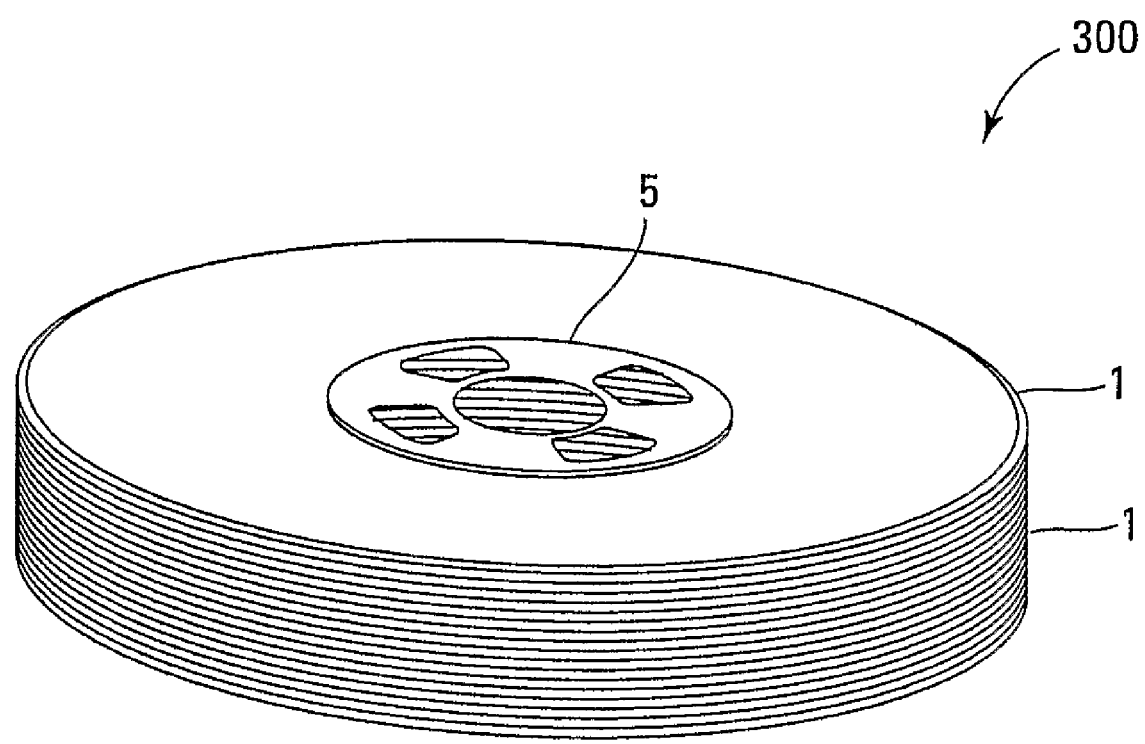
FIG. 12 is a perspective view showing an embodiment of a fuel cell stack assembly according to a further embodiment of the present invention.

FIG. 12 shows an embodiment for the fuel cell stack for the solid electrolyte fuel cell according to certain embodiments of the present invention. As shown in FIG. 12, this fuel cell stack assembly 300 may be created by bonding an electrically insulating gas seal to each central flow channel part 5 of the solid electrolyte fuel cell 1. For example, it may be possible to employ a method that uses a ceramic adhesive and a gasket constructed of glass and ceramic fibers inserted for fusion, and bonded to the insulation using a wax.

With this fuel cell stack assembly 300, high temperature gas may be introduced and heated during starting and in this upstream area, there may be a tremendous thermal shock due to the high temperature gas but due to the lamination of the solid electrolyte fuel cell, it may be appropriate for vehicular use due to the strength against thermal shock during startup and stopping as well as high structural durability.

The present invention is not limited to the previously described embodiments. Thus, it may be possible to make a variety of modifications and changes within the scope of the technological disclosure and claims of the present invention, and these modifications and changes are equivalent to the present invention. For example, while straight ribs may be shown in certain embodiments, other shapes, for example curved ribs may be advantageously used. In addition, the number and shapes of the unit fuel cell components may be varied from the disclosed embodiments, and the number and type of unit fuel cells used in a fuel cell stack assembly may vary from the disclosure without departing from the scope of the claimed invention.

Various materials have been described for producing fuel cell components, unit fuel cells and fuel cell assemblies according to the described embodiments, but other equivalent materials may be freely substituted for the disclosed materials. Various embodiments of the invention have been described. These and other embodiments are within the scope of the following claims.

What is claimed is:

1. A fuel cell, comprising,
a first separator plate;
a second separator plate joined to the first separator plate to form a chamber between the joined separator plates, the second separator plate having a mounting hole to fix a solid electrolyte layer and the mounting hole extending through a surface of the second separator plate facing the first separator plate; and
a porous pyroelectric member in the chamber, the porous pyroelectric member including a first density part and a second density part having a higher density than that of the first density part and the second density part comprising a plurality of ribs in a surface of the porous pyroelectric member;
wherein the second density part is connected to the first separator plate and at least two opposing sides of the second density part are in contact with the first density part; and
wherein at least one of the first separator plate and the second separator plate comprises a plurality of ribs joined to the plurality of ribs of the porous pyroelectric member, each of the plurality of ribs of the porous pyroelectric member pre-formed in the surface of the porous pyroelectric member for alignment with the plurality of ribs of the at least one of the first separator plate and the second separator plate.

2. A fuel cell according to claim 1 wherein the first and second separator plates have a substantially circular cross-section, and wherein the ribs are directed radially outward from a position proximate a center to a position proximate an outer circumference of the substantially circular cross-section.

3. A fuel cell according to claim 1, further comprising:
a plurality of fluid distribution channels, wherein each channel is positioned between two ribs joined to a surface of at least one of the first or second separator plates.

4. A fuel cell according to claim 1, wherein a surface of the porous pyroelectric member comprises a plurality of bonding bands.

5. A fuel cell according to claim 4, wherein the first and second separator plates have a substantially circular cross-section, and wherein the bonding bands are directed radially outward from a position proximate a center to a position proximate an outer circumference of the substantially circular cross-section.

6. A fuel cell according to claim 4, wherein each bonding band of the second separator plate is aligned with a rib of the first separator plate.

7. A fuel cell according to claim 4, wherein a manifold is positioned proximate a center of each separator plate.

8. A fuel cell according to claim 7, wherein the ribs of the first separator plate are joined to the bonding bands of the second separator plate, thereby forming a plurality of channels on the surface of the second separator plate in fluid communication with an opening in the manifold.

9. A fuel cell according to claim 8, wherein the opening in the manifold is in fluid communication with at least a portion of the chamber between the joined first and second separator plates 10. A fuel cell according to claim 1, wherein the first density part and the second density part of the porous pyroelectric member are positioned within the chamber between the first and second separator plates.

11. A fuel cell according to claim 10, wherein the porous pyroelectric member comprises at least one of a woven mesh, a non-woven material, or a metal foam.

12. A fuel cell according to claim 11, wherein the porous pyroelectric member comprises a heat resistant alloy having nickel and iron as major elements and one or more of chromium, nickel, platinum and silver as minor elements.

13. A fuel cell according to claim 1, wherein the first and second separator plates comprise metal.

14. A fuel cell according to claim 13, wherein a surface of the first and second separator plates comprises an alloy having iron or nickel as the primary element, at a thickness of from about 0.05 to about 0.5 millimeters.

15. A fuel cell according to claim 13, wherein the first and second separator plates are joined using one or more of laser welding, resistance welding, seam welding, dispersion welding, soldering, brazing, and bonding.

16. A fuel cell according 1, wherein the porous pyroelectric member is joined to at least one of the first and second separator plates using one or more of laser welding, resistance welding, seam welding, dispersion welding, soldering, brazing, and bonding.

17. A fuel cell according to claim 16, wherein bonding is achieved using one or more of a conductive wax, a conductive paste, and a conductive adhesive.

18. A fuel cell system, comprising
a first separator plate;
a second separator plate joined to the first separator plate to form a chamber between the joined separator plates, the second separator plate having a mounting hole to fix a solid electrolyte layer; and
means for transmitting electrical energy reacted by the solid electrolyte layer to the first separator plate, wherein the means is connected to the first separator plate at the part of which a density is higher than the other part.

19. The fuel cell system according to claim 18, further comprising:
the mounting hole extending through a surface of the second separator plate facing the first separator plate.

20. The fuel call system according to claim 19, wherein the other part is a first density part and the part of which the density is higher than the other part is a second density part, the first density part and the second density part forming alignment means for aligning the means with the first separator plate during manufacture of the fuel call system; and wherein at least two opposing sides of the second density part are in contact with the first density part.

* * * * *